United States Patent Office 3,134,767
Patented May 26, 1964

3,134,767
SYNTHETIC PENICILLIN
Frank Peter Doyle, Betchworth, John Herbert Charles Nayler, London, and George Newbolt Rolinson, Betchworth, England, assignors to Beecham Group Limited, Brentford, England, a British company
No Drawing. Filed Oct. 9, 1961, Ser. No. 143,558
Claims priority, application Great Britain Apr. 20, 1960
7 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and more particularly, relates to 6-(2 - phenylbenzamido)penicillanic acid and nontoxic salts thereof.

This application is a continuation-in-part of our prior, copending application Serial Number 49,852, filed August 16, 1960, which was a continuation-in-part of our prior, copending application Serial Number 23,881, filed May 2, 1960, and issued September 6, 1960, as United States Patent No. 2,951,839, which was in turn a continuation-in-part of our prior, copending application Serial Number 831,483, filed August 4, 1959, and now abandoned, which was a continuation-in-part of our prior, copending application Serial Number 750,075, filed July 22, 1958, and issued June 21, 1960 as United States Patent No. 2,941,995.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. The compounds of the present invention, in addition to their potent antibacterial activity, exhibit resistance to destruction by acid and by penicillinase and are effective against benzylpenicillin-resistant strains of bacteria and, in contrast to 2,6-dimethoxyphenyl-penicillin, are particularly well absorbed and useful upon oral administration in man.

There is provided, according to the present invention, a member selected from the group consisting of an acid having the formula

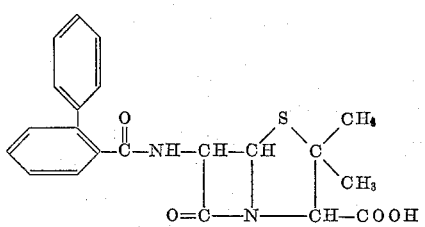

and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N′-dibenzylethylenediamine, dehydroabietylamine, N,N′-bis-dehydroabietylethylenediamine, N-(lower)alkylpiperidines, e.g., N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with the acid chloride having the formula:

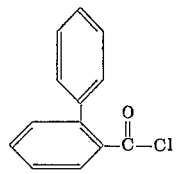

or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy or isobutoxy-carbonic acid comprises mixing 0.01 mole of the acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of the compound of the present invention comprises preparing a solution in 20 ml. water of 0.00463 mole 6-amino-penicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone nad dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257–258, January 24, 1959) or Belgian Patent 569,728.

The following examples will serve to illustrate this invention without limiting it thereto.

*Example 1*

Triethylamine (13.9 ml., 0.1 mole) is added to 2-phenylbenzoic acid (19.8 g., 0.1 mole) in tetrahydrofuran (150 ml.) at −10° C. After 10 minutes ethylchloroformate (9.6 ml., 10.8 g., 0.1 mole) is added causing the temperature to rise to −7° C. and thereafter 6-aminopenicillanic acid (21.6 g., 0.1 mole) in 40 ml. of water and 15 ml. of triethylamine is added. The reaction mixture is stirred 1½ hours in a cooling bath and for an additional 2 hours at room temperature. The reaction mixture is then diluted with water, made alkaline with saturated sodium bicarbonate solution, and extracted with methylisobutyl ketone. The aqueous phase is then acidified to pH 2 with 42% phosphoric acid and extracted with methylisobutyl ketone. The extract is then washed with water and to the extract is added 38 ml. (0.1 mole) of 40% potassium ethylhexanoate in n-butanol. After an hour the solvent is removed by evaporation in a rotary evaporator at 40° C. The resulting white solid is slurried with dry ether and the hygroscopic product collected by filtration, and dried in vacuo over $P_2O_5$. The product, the potassium salt of 6-(2-phenylbenzamido)penicillanic acid, is found to weigh 37.0 gm., to decompose at 112–116° C., to contain the β-lactam ring as shown by infrared analysis, and to inhibit *Staph. aureus* Smith at concentrations below 0.001 percent by weight.

*Example 2*

Following J. Am. Chem. Soc. 68, 2242, 1946, and 61, 816, 1939, pellets of potassium hydroxide (150 g.) were ground in a mortar, placed in a flask and covered with one liter of diphenyl ether (Dowtherm A). After adding 50 g. (0.277 m.) fluorenone (see J. Am. Chem. Soc. 53, 2720, 1931) the mixture was heated as rapidly as possible by means of a heating mantle with rapid stirring to a pot temperature of 180° C., which required 30 minutes. The pot temperature was then maintained at 180–185° C. for one hour. The heating mantle was then removed and when the pot temperature had fallen to about 65° C. the flask was surrounded by an ice bath. Water (500 ml.) was then added to the cooled mixture and stirring extracted the product, potassium 2-phenylbenzoic acid (also called 2-biphenylcarboxylic acid) into the aqueous phase.

After separating the aqueous phase, the solvent phase was extracted twice with 250 ml. portions of water and the combined aqueous extracts were then extracted twice with 200 ml. portions of diethyl ether to remove a small amount of suspended diphenyl ether. The aqueous phase was chilled in an ice bath and acidified with 300 ml. concentrated hydrochloric acid to precipitate the product as an oil which crystallized on cooling and scratching and was collected by filtration. A sample was dried on filter paper and found to melt at 107–109° C. (literature m.p. for 2-biphenylcarboxylic acid 110–111° C.; corrected 113.5–114.5° C.; see Beilstein 9, 699; I, 279; II, 463).

The main fraction of product, which was still wet, was dissolved in toluene (250 ml.) dried over $Na_2SO_4$, filtered (with an additional 100 ml. toluene being used to wash flask and filter) and the toluene was removed by evaporation at reduced pressure in a rotary flask evaporator. The residue crystallized to give 54.4 g. (theoretical yield 54.8 g.) of 2-phenylbenzoic acid.

2-phenylbenzoic acid (54.4 g.) and 100 ml. thionyl chloride were warmed 30 minutes on the steam bath. The excess $SOCl_2$ was removed by distillation in vacuo and the residue was vacuum distilled to give the product, 2-phenylbenzoyl chloride, also called 2-biphenylcarbonyl chloride, 51.9 g., B.P. 101–103° C./0.3 mm. The literature gives B.P. 169° C./16 mm., 163° C./10 mm., Beilstein 9, 669; I, 279; II, 463.

2-biphenylcarbonyl chloride (48.4 g., 0.223 m.) in 100 ml. acetone was added rapidly in two minutes to a vigorously stirred mixture of 6-aminopenicillanic acid (48.3 g.), sodium bicarbonate (56.4 g., 0.681 m.), water (330 ml.) and acetone (230 ml.) maintained initially at 5° C. and subsequently at 10–13° C. The reaction mixture was stirred for 20 minutes after the acid chloride had been added and was then extracted with 500 ml. and again with 250 ml. portions of ethyl acetate. The aqueous phase was covered with 500 ml. ethyl acetate and acidified with 42% phosphoric acid. After extracting the product, 6-(2-phenylbenzamido)penicillanic acid, also called 2-biphenylyl-penicillin, with the ethyl acetate and also with two additional 200 ml. portions of ethyl acetate, the combined solvent extracts were dried a few minutes over $Na_2SO_4$ and filtered, using an additional 50 ml. ethyl acetate to wash the flask and filter. To the filtrate there was then added 84.2 ml. of a solution in n-butanol of 0.223 mole sodium 2-ethylhexanoate. Upon scratching, crystalline sodium 6-(2-phenylbenzamido)penicillanate precipitated over three hours at room temperature and was collected by filtration, washed on the filter with 400 ml. ethyl acetate in three portions and air-dried overnight. After drying in vacuo over $P_2O_5$ the product weighed 70.5 g. and melted with decomposition at 173–180° C.

This product, which appeared to be a monohydrate, exhibited $[\alpha]_D^{26° C.}$ of $+262°$ (c.=1 in water).

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:
1. 6-(2-phenylbenzamido)penicillanic acid.
2. Sodium 6-(2-phenylbenzamido)penicillanate.
3. Potassium 6-(2-phenylbenzamido)penicillanate.
4. Dibenzylamide 6-(2-phenylbenzamido)penicillanate.
5. N,N' - dibenzylethylenediamine 6 - (2 - phenylbenzamido)penicillnate.
6. N,N'-dehydroabietylethylenediamine 6 - (2 - phenylbenzamido)penicillanate.
7. A member selected from the group consisting of a compound of the formula:

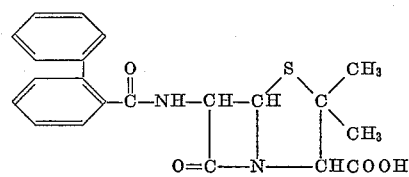

and its nontoxic pharmaceutically acceptable salts.

No references cited.